United States Patent
Wu et al.

(10) Patent No.: US 7,937,545 B1
(45) Date of Patent: May 3, 2011

(54) METHOD AND APPARATUS FOR FILE-LEVEL RESTORE FROM RAW PARTITION BACKUPS

(75) Inventors: Weibao Wu, Vadnais Heights, MN (US); Graham Bromley, Dublin, CA (US); James P. Ohr, St. Paul, MN (US)

(73) Assignee: Symantec Operating Corporation, Mountain View, CA (US)

( * ) Notice: Subject to any disclaimer, the term of this patent is extended or adjusted under 35 U.S.C. 154(b) by 753 days.

(21) Appl. No.: 11/392,202

(22) Filed: Mar. 29, 2006

(51) Int. Cl.
*G06F 12/00* (2006.01)

(52) U.S. Cl. ......................................... 711/162; 709/219

(58) Field of Classification Search .................. 711/162, 711/153, 161, 202, 203, 205, 206, 207, 208, 711/209; 707/204; 709/203, 215, 219; 714/6, 714/7, 11, 13
See application file for complete search history.

(56) References Cited

U.S. PATENT DOCUMENTS

| | | | | |
|---|---|---|---|---|
| 5,931,918 | A * | 8/1999 | Row et al. .................... | 719/321 |
| 6,047,294 | A * | 4/2000 | Deshayes et al. ............. | 707/204 |
| 7,281,104 | B1 | 10/2007 | Tsypliaev et al. | |
| 2003/0041207 | A1* | 2/2003 | Kamakura et al. ............ | 710/305 |
| 2004/0220981 | A1* | 11/2004 | Taylor ............................ | 707/204 |
| 2004/0250033 | A1* | 12/2004 | Prahlad et al. ................ | 711/162 |
| 2005/0216788 | A1 | 9/2005 | Mani-Meitav et al. | |
| 2006/0143501 | A1 | 6/2006 | Tormasov et al. | |
| 2006/0217952 | A1* | 9/2006 | Wu et al. ........................ | 703/24 |

OTHER PUBLICATIONS

"Data Sheet: Backup and Recovery," Symantec LiveState™ Recovery 6.0, Copyright © 2006 Symantec Corporation, Feb. 2006, 4 pages.

* cited by examiner

*Primary Examiner* — Jared I Rutz
(74) *Attorney, Agent, or Firm* — Robert C. Kowert; Meyertons, Hood, Kivlin, Kowert & Goetzel, P.C.

(57) ABSTRACT

Method and apparatus for file-level restore from raw partition backups. A backup mechanism may be provided that is configured to perform raw partition backups to a media server and to support file-level restores from the raw partition backups through, for example, Fibre Channel (FC) or iSCSI Logical Unit (LUN) export of the raw partition backup images to client systems. Once a LUN is exported and mounted on the client system, direct file manipulation using standard file system commands may be performed. Embodiments achieve both fast backup and individual file retrieval without the necessity of understanding native file system formats and without requiring a file system mapping of the source (client) partition. Thus, embodiments may be used in heterogeneous environments.

20 Claims, 6 Drawing Sheets

METHOD AND APPARATUS FOR FILE-LEVEL RESTORE FROM RAW PARTITION BACKUPS

BACKGROUND OF THE INVENTION

1. Field of the Invention

This invention is related to the field of computer systems and, more particularly, to file-level restores from raw storage partition backups.

2. Description of the Related Art

For file system with a large number of files, it may be more efficient to perform backups at the raw partition level than to perform backups at the file system level, as iterating each file in a large file system to perform file system-level backups tends to be expensive and time-consuming. However, it may be necessary or desirable to perform file-level restores from a raw partition backup rather than restoring the entire partition. A client may wish to restore one or a few files; requiring that an entire partition be restored when just a selection of files need to be restored is understandably inefficient, and may result in the undesirable overwriting of other data. Some conventional raw partition-level backup mechanisms have approached this problem by mapping the file system first, backing up this mapping information, and then backing up the raw partition to a media server. The raw partition data, together with the file system mapping information, may then form the basis for file system level restores from the media server.

The key to these conventional backup systems is file mapping, which is primarily a file system- and operating system-specific operation. The tasks of sufficiently understanding a file system/operating system to program the backup mechanism to support the file system, may be difficult and complex, requiring extensive knowledge of the file system and operating system. Programming the backup mechanism to support different file systems or different versions of file systems, and porting the backup mechanism to different platforms, may be even more difficult and complex. For example, it may take considerable effort to adapt one of these conventional backup mechanisms to support new generations or versions of file systems, such as Solaris ZFS® and new Microsoft® file systems. Note that this is true for new generations or versions of file systems that the backup mechanism already supports. Adding support for completely new file systems or for currently unsupported file systems may be even more complex and difficult. Thus, these backup mechanisms tend to be file system/platform specific, and may require considerable modifications and updates just to keep pace with changes in the file system that they support.

In addition, file system mapping may be a bottleneck in the backup process, as it may take much more time to perform the file system mapping than it does to backup the raw partition itself. In fact, this technique may in some cases not be that much more efficient than performing a file system-level backup. Another issue with file system mapping as a solution to allow file-level restores from raw partition backups is the correctness of mapping various file systems. File-level restore cannot be successfully performed if the file system mapping is not performed correctly. Note that this issue is related to the complexity and difficulty of sufficiently understanding and programming the backup mechanism to support file systems.

SUMMARY

Embodiments of a method and apparatus for file-level restore from raw partition backups are described. In embodiments, a data backup mechanism may be provided that is configured to perform raw partition backups to a media server and to support file-level restores from the raw partition backups through Fibre Channel (FC) or iSCSI Logical Unit (LUN) export of the raw partition backup images. Note that FC and iSCSI are provided as examples of protocols that may be used to provide LUN export of raw partition backup images; other protocols may be used. In embodiments, an iSCSI/FC interface, together with components of the backup mechanism, may export raw partition backup images as SCSI LUNs to client systems. Once a LUN is exported and mounted on the client system, direct file manipulation using standard file system commands may be performed. Embodiments achieve both fast backup and individual file retrieval without the necessity of understanding native file system formats and without requiring a file system mapping of the source (client) partition.

The backup mechanism and media server do not need to understand the format of the data in a raw partition backup image to provide file level restore, and thus the backup mechanism does not need to perform file system mapping when doing the raw partition backup. The client system is not required to do any mapping; the client system simply mounts a raw partition backup image exposed as a SCSI LUN as a remote disk and accesses the data on the remote disk using standard file system commands. When the client system accesses the remote disk via a SCSI command, the backup mechanism translates requests for blocks of data from the raw partition backup to the storage location of the blocks in the media server file system and returns the requested blocks to the client system via the protocol used to mount the SCSI LUN (e.g., iSCSI or FC).

Embodiments may provide both fast backup of data via raw partition backups and file level restore in heterogeneous environments. For example, a client system may be a Microsoft Windows® client. Raw partition backups may be performed from the client system to a Linux® media server. On the Linux server, a raw partition backup may be exposed/exported to the client system. The disk may be exported, for example, on a FC network or on an IP network via iSCSI. The client system will see a remote disk exported over the FC or IP network, and can mount the remote disk. The client system understands the data that is on the remote disk, and can perform file system operations on the remote disk, such as restoring files from the remote disk to a local disk.

BRIEF DESCRIPTION OF THE DRAWINGS

The following detailed description makes reference to the accompanying drawings, which are now briefly described.

Figure 1A:
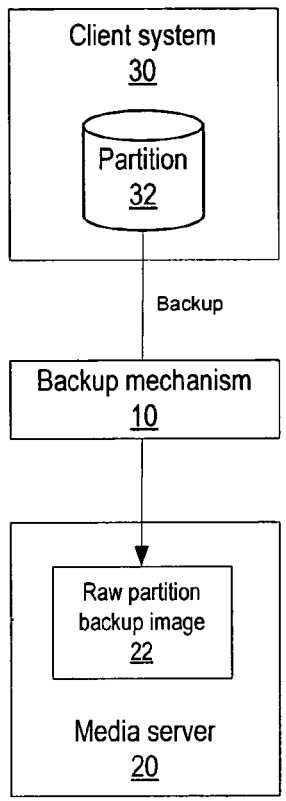
FIGS. 1A through 1C illustrate a backup mechanism that provides raw partition backups to a media server and file-level restores from the raw partition backup images through Fibre Channel (FC) or iSCSI Logical Unit (LUN) export of the raw partition backup images according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for file-level restore from raw partition backups are described. In embodiments, a data backup mechanism may be provided that is configured to perform raw partition backups to a media server and to support file-level restores from the raw partition backups through Fibre Channel (FC) or iSCSI Logical Unit (LUN) export of the raw partition backup images as virtual disks. Embodiments may provide both efficient backups via raw partition backups and the ability to perform individual file restores from the raw partition backup images in heterogeneous environments. Note that FC and iSCSI are provided as examples of standard protocols that may be used to provide SCSI LUN export of raw partition images; other standard protocols that support SCSI LUN export may be used.

Embodiments may provide a volume-level, point-in-time snapshot of an original file system or portions (partitions) of a file system via a raw partition backup to a media server. Individual files may be recovered on a client system from the snapshot using native OS tools after mounting a raw partition backup image as a SCSI LUN, or alternatively entire raw partition backup images may be recovered via partition-level restore software if necessary or desired.

Embodiments may provide both fast backup of data via raw partition backups and file level restore in heterogeneous environments. For example, a client system may be a Microsoft Windows® client. Raw partition backups may be performed from the client system to a Linux® media server. On the Linux server, a raw partition backup may be exposed/exported as a disk. The backup mechanism may not need to know what is in the raw partition backup, or the format of the data in the raw partition backup. The disk may be exported, for example, on a FC network or on an IP network via iSCSI. For iSCSI, on the Linux system, there may be an iSCSI target driver. On the Windows system, there may be an iSCSI initiator driver. For FC, each system may include FC connections and drivers. The client system will see a remote disk exported over the FC or IP network, and can mount the remote disk. The client system understands the data that is on the remote disk, and can perform file system operations on the remote disk, such as restoring files from the remote disk to a local disk.

Through embodiments of the backup mechanism, a media server may provide fast backup of data via raw partition backups and file level restore to different platforms: Unix, Windows, Linux, Solaris®, etc. The media server does not need to understand the format of the data in a raw partition to provide file level restore, and thus does not need to perform file system mapping when doing the raw partition backup. The client system is not required to do any mapping; the client system simply mounts a raw partition on the media server as a remote disk and accesses the data on the remote disk using standard file system commands.

When the client system reads from the remote disk via a SCSI command, the backup mechanism translates requests for blocks of data from the raw partition backup to the storage location of the blocks in the media server file system and returns the requested blocks to the client system via the protocol used to mount the SCSI LUN (e.g., iSCSI or FC). In one embodiment, Mode information on the media server file system may be used to perform the translation.

In embodiments, an iSCSI and/or FC interface, together with components of the backup mechanism, may export raw partition backup images as SCSI LUNs to client systems. Raw partition backup images can be exported for iSCSI and/or FC target drivers as SCSI LUNs. Once a LUN is exported and mounted on the client, individual files in the LUN/file system can be retrieved. The LUNs can be mounted on the client systems for direct file manipulation using standard file system commands. Using embodiments, raw partition backup images, which are much faster to perform than file level backup when the number of files is large, may thus be used to restore individual files. Thus, embodiments achieve both fast backup and individual file retrieval without the necessity of understanding native file system formats.

Figure 1B:
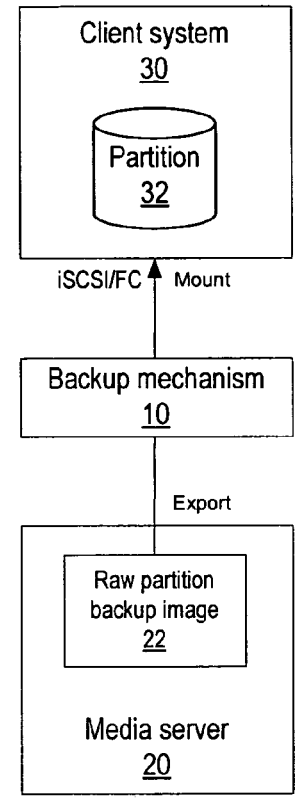
Figure 1C:
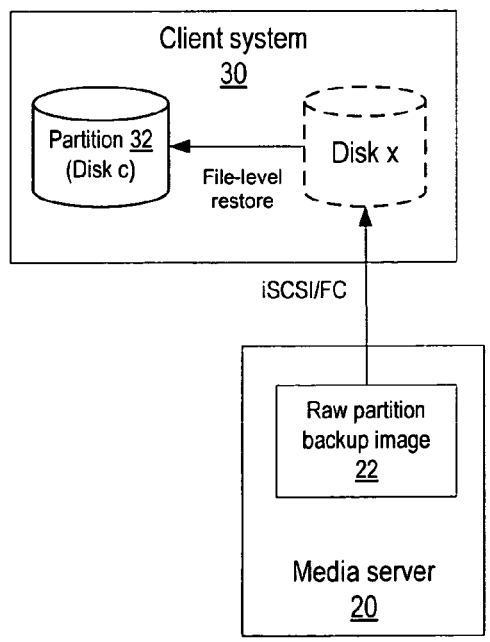

FIGS. 1A through 1C illustrate a backup mechanism that provides raw partition backups to a media server and file-level restores from the raw partition backup images through Fibre Channel (FC) or iSCSI Logical Unit (LUN) export of the raw partition backup images according to one embodiment. In embodiments, as illustrated in FIG. 1A, data on client systems 30 may be backed up to a media server 20 as raw partition backup images 22 by backup mechanism 10. As illustrated in FIG. 1B, a raw partition backup image 22 may be exported from the media server 20 and mounted on a client system 30 through an iSCSI or Fibre Channel (FC) target driver as a SCSI LUN. As illustrated in FIG. 1C, files on the raw partition backup image 22 may then be accessed through native operating system (OS) tools on the client system 30. For example, after mounting a raw partition backup image 22, files within the raw partition backup image 22 may be accessed on the client system 30 in accordance with standard file system tools or commands, such as cd, ls, vi, and cp in Unix systems, and drag-and-drop or Windows file system commands in Windows systems. On the client system 30, the mounted raw partition backup image 22 appears as "just another disk". For example, in FIG. 1C, the original partition may be Disk c, and the raw partition backup image may be mounted as Disk x. Thus, embodiments may provide both fast backup of data via raw partition backups and file level restore in heterogeneous environments.

The client system 30 and the media server 20 may be, but are not necessarily, operating in accordance with heterogeneous file systems/platforms. For example, the media server 20 may be a Linux® platform, and the client system 30 may be a Microsoft Windows® platform, another Linux or Unix platform, a Solaris platform, or some other operating system/file system platform. Note that other platforms than Linux may be used on the media server 20.

Embodiments of the backup mechanism 10 do not require a file system mapping of the source (client) partition 32, and thus may be more efficient than conventional raw partition backup mechanisms that map the files on a partition in accordance with the file system as a first step in order to provide file-level restore support. Further, embodiments of the backup mechanism 10 do not require knowledge of the file system/operating system environments of the source system (client system 30) to backup raw partitions 32 or to export raw partition backup images 22, and thus may be used to support both raw partition backups from and file level restores to heterogeneous file systems/client systems. All that may be required of a client system to perform file system level file restores from a backed-up raw partition is support for FC, iSCSI, or other protocol for mounting the raw partition images from a media server 20.

Embodiments of the backup mechanism 10 may support block level incremental (BLI) backups of raw partitions. With BLI backups, instead of backing up an entire raw partition every time a raw partition backup is performed, only changed blocks of data in the raw partition may be backed up. For example, if performing a raw partition backup of a 20 gigabyte disk once a day, without BLI, the entire 20 gigabytes would be backed up every day. With BLI, only the changed blocks of the disk would be backed up.

For a raw partition that is backed up using BLI, the backup mechanism 10 may determine the "virtual" partition to be exported from the last full raw partition backup and any subsequent BLI backups. This "virtual" partition may then be exported via a SCSI LUN to a client system 30 so that the client system 30 sees the most up-to-date backed-up data of the raw partition.

Figure 2:
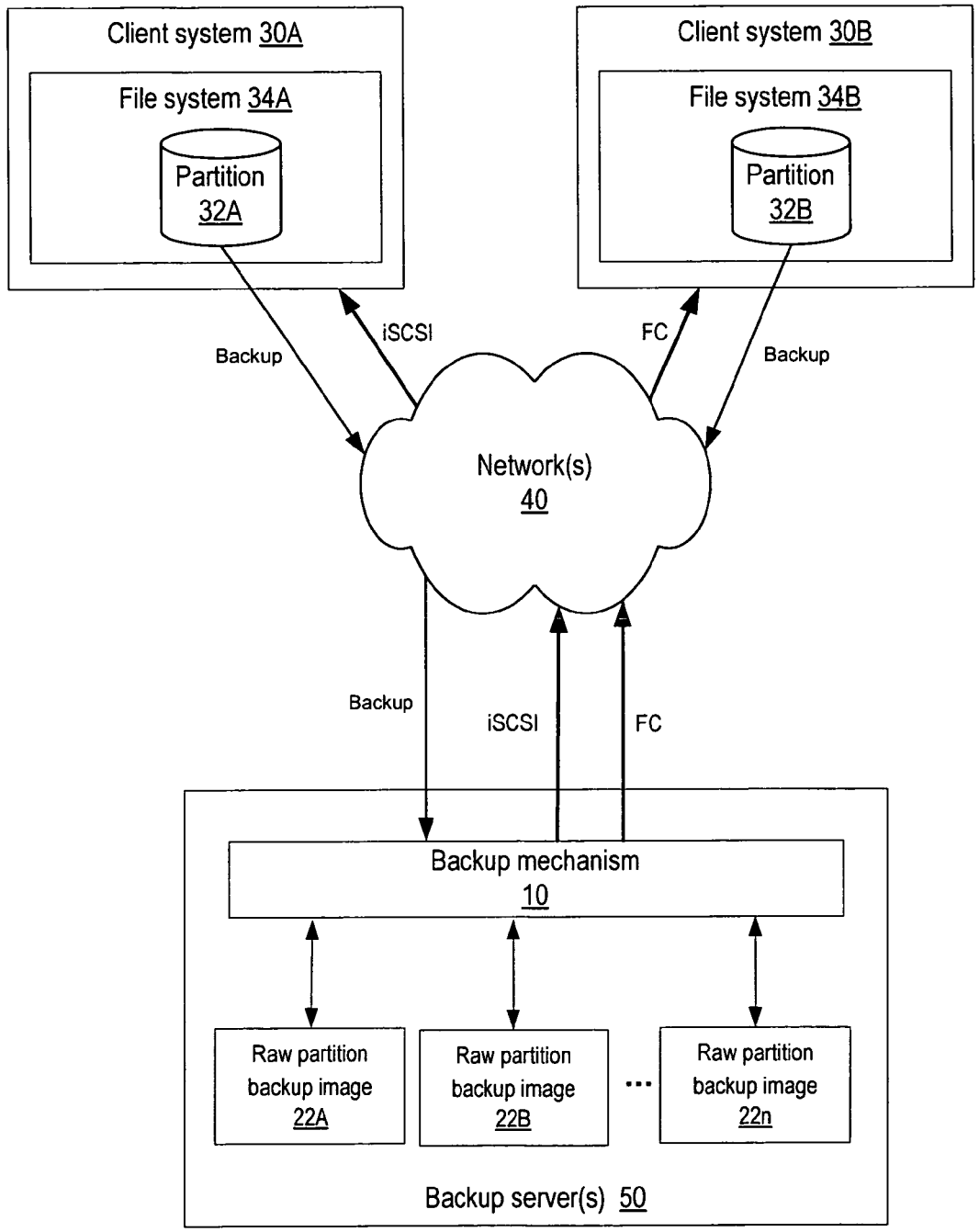
FIG. 2 illustrates a backup mechanism providing raw partition backups to a media server and file-level restores from the raw partition backup images through Fibre Channel (FC) or iSCSI Logical Unit (LUN) export of the raw partition backup images in a heterogeneous network environment according to one embodiment.

FIG. 2 illustrates a backup mechanism providing raw partition backups to a media server and file-level restores from the raw partition backup images through Fibre Channel (FC) or iSCSI Logical Unit (LUN) export of the raw partition backup images in a heterogeneous network environment according to one embodiment. Client systems 30A and 30B may be running different file systems 34A and 34B, respectively. Partitions 32A and 32B on client systems 30A and 30B, respectively, may be backed up to backup server(s) 50 as raw partition backup images 22A and 22B, respectively, by backup mechanism 10. The backup of the partitions 32 may be, but is not necessarily, performed over a network 40. Note that there may be other raw partition backup images 22, including other raw partition backup images 22 for client systems 30A and 30B and/or other raw partition backup images for other client systems 30, on backup servers 50. A raw partition backup image 22 may be exported from the backup server(s) 50 and mounted on a client system 30 through an iSCSI or Fibre Channel (FC) target driver as a SCSI LUN over a network 40. Files on the raw partition backup image 22 may then be accessed through native operating system (OS) tools on the client system 30. For example, after mounting raw partition backup image 22A on client system 30A via an iSCSI target driver, files within the raw partition backup image 22A may be accessed on client system 30A in accordance with file system tools or commands of file system 34A, for example to restore one or more files to partition 32A. After mounting raw partition backup image 22B on client system 30B via an FC target driver, files within the raw partition backup image 22B may be accessed on client system 30B in accordance with file system tools or commands of file system 34B, for example to restore one or more files to partition 32B.

Note that, in one embodiment, a raw partition backup image 22 may be exported to and mounted on a client system 30 different than the client system 30 from which the raw partition backup image 22 was backed up, as long as the different client system 30 supports the file system 34 of the original client system 30 and supports iSCSI, FC or another protocol that may be used to export and mount SCSI LUNs over a network. In one embodiment, a security mechanism or mechanisms may be used to validate that a client system 30 has access to a raw partition backup image 22 before allowing the client system 30 to mount the raw partition backup image 22.

Figure 3:
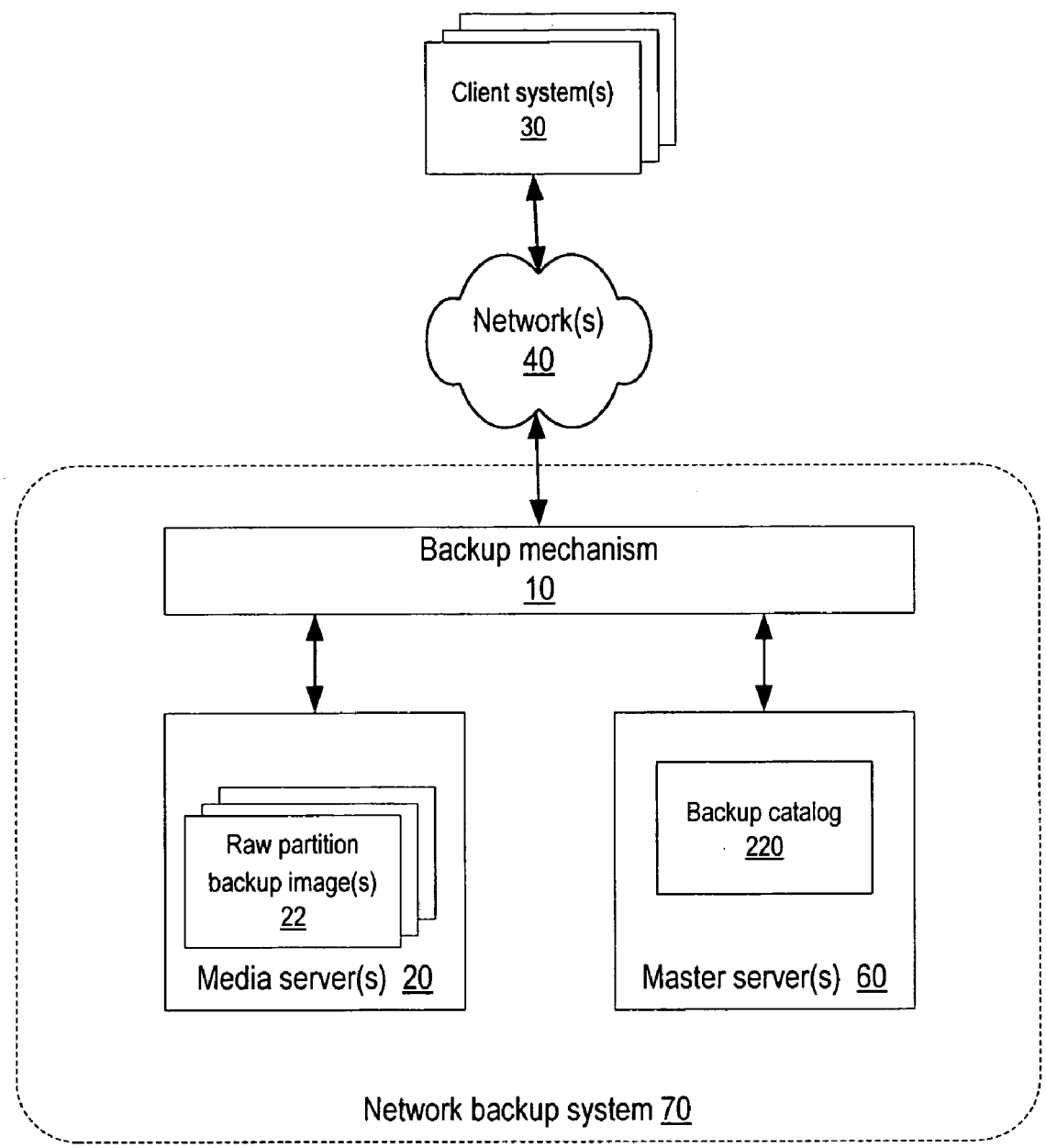
FIG. 3 illustrates servers that may be used in an exemplary backup system comprising a backup mechanism as described herein, according to one embodiment.

FIG. 3 illustrates servers that may be used in an exemplary backup system comprising a backup mechanism as described herein, according to one embodiment. In this embodiment, media server(s) 20 may store raw partition backup image(s) 22 that are backed up from client systems 30 by backup mechanism 10. Master server(s) 60 may store a backup catalog 220. Master server(s) 60 may also include and implement backup and restore policies, schedules, etc. Backup mechanism 10 may conceptually lie between media server(s) 20 and master server(s) 60 and client(s) 30. Note that components of backup mechanism 10 may be implemented on a separate server, and/or on one or more of media server(s) 20 and master server(s) 60. In one embodiment, backup mechanism 10, media server(s) 20, and master server(s) 60 may be part of a network backup system 70. Note that network backup system 70 may support other functionalities, such as file system level backups and restores, backups to tape or other media, etc., in addition to raw partition backups and file-level restore from raw partition backups as described herein. Network backup system 70 may also include other servers and/or other components that are not shown.

Figure 4:
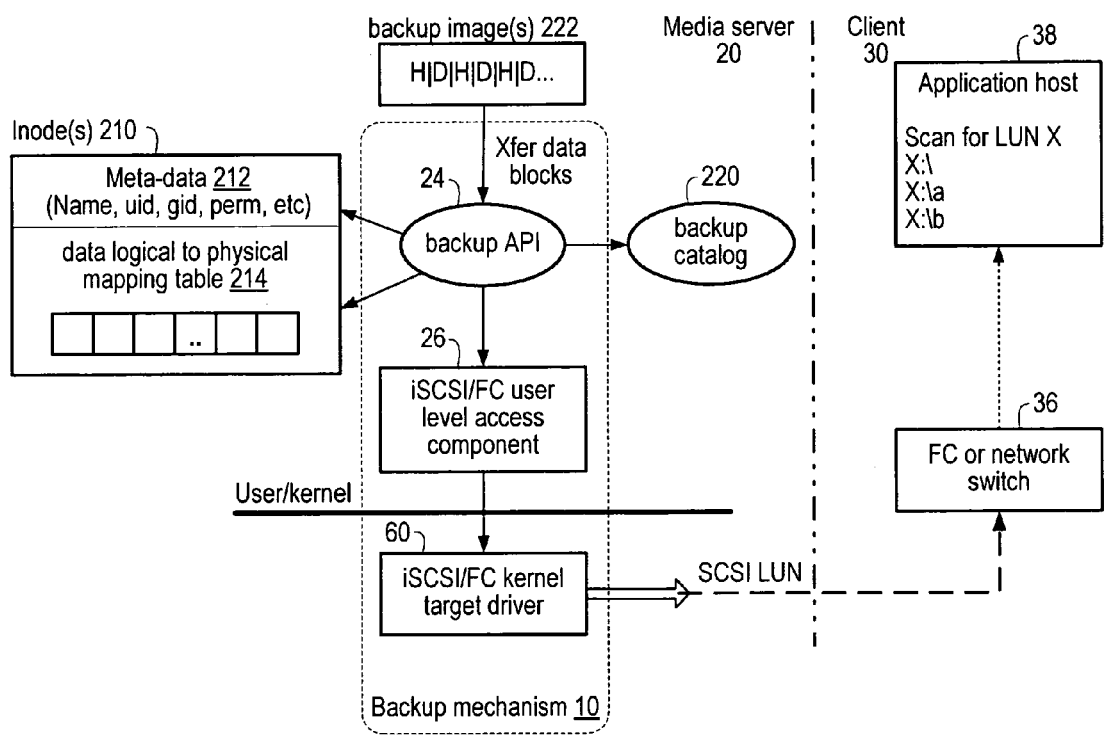
FIG. 4 illustrates an exemplary architecture for a backup mechanism for exporting a raw partition backup image through a SCSI LUN in more detail, according to one embodiment.

FIG. 4 illustrates an exemplary architecture for a backup mechanism for exporting a raw partition backup image through a SCSI LUN in more detail, according to one embodiment. In FIG. 4, backup image(s) 222 represent one or more raw partition backup images. Backup image(s) 222 may be stored as Header/Data/Header/Data, where each Data represents the data of a raw partition backup image 22, and each Header represents a header for the raw partition backup image 22. Thus, there may be one header for each raw partition backup image 22. Note that the backup mechanism 10 may backup one, two or more raw partitions from a client 30 into backup image(s) 222. When stored, a raw partition backup image 22 may or may not include a header. Further, in FIG. 4, backup mechanism 10 is shown as including backup API 24, iSCSI/FC user level access component 26, and iSCSI/FC kernel target driver 60 as components. Note that this is an exemplary architecture, and that other embodiments may include one or more other components or different components, and that other components illustrated on FIG. 4 may be considered as logically part of the overall backup mechanism 10.

In embodiments, one or more raw partition backups 22 in backup image(s) 222 may be exported via one or more standard block level protocols such as iSCSI and FC. A raw partition backup image 22 in backup image(s) 222 may be exported through an iSCSI/FC target driver 60 on a media server 20, and mounted on a remote host 38 as a SCSI LUN. Once the disk is made available as a SCSI LUN on the host 38, files may be accessed from the raw partition backup image 22 in backup image(s) 222 through standard file system tools on the host 38.

In one embodiment, there may be no need for the backup mechanism 10 to understand the content and file format of a raw partition 32 such as raw partitions 32A and 32B illustrated in FIG. 2. Backup mechanism 10 may only need to provide raw blocks as requested from the client 30. Once a SCSI LUN is mounted on the client 30, the content of the raw partition backup image 22 may be accessed through the local file system on the client 30. A read request from the local file system of the client 30 will be sent to the iSCSI/FC target driver 60, which in turn will get data blocks from the backup image 22 via the backup mechanism 10.

Backup catalog 220 may include information on the raw partition backup images 22 in backup image(s) 222, for example the names, dates, and other information relevant to each raw partition backup image 22. Inode(s) 210 may include metadata 212 and a data logical to physical mapping table 214 for each raw partition backup image 22 in backup image(s) 222. Metadata may include one or more of, but is not limited to, the file name, creation/modification times, permission/ACLs etc. for the raw partition backup image, and may be obtained from the backup catalog 20. Data logical to physical mapping table 214 may provide a mapping of the logical data in a raw partition backup image 22 to the physical location of the data in data storage.

Backup API 24 represents a component or module of backup mechanism 10. One task of backup API 24 may be to access the backup catalog 220 to obtain information on the raw partition backup images 22 in backup image(s) 222. For example, the backup, API 24 may access the backup catalog 220 to determine that there are two raw partition backup images 22 in backup image(s). The information in backup catalog 220 may be further examined to determine name(s) of the raw partition backup images 22. This information may be provided to client 30 so that the client can see what "disks" are available to be mounted.

iSCSI/FC kernel target driver 60 may be configured to communicate with iSCSI/FC user level access component 26. iSCSI/FC user level access component 26 may be the component of the backup mechanism 10 that provides an interface that is accessible by client 30 to view the raw partition backup images 22 in backup image(s) 222 that are available for mounting via a SCSI LUN, and may provide an interface for the client 30 to request access to a particular raw partition backup image 22 in backup image(s) 222. When the client 30 issues a request to access a particular raw partition backup image 22, the backup API 24 may be made aware of which raw partition backup image 22 is to be accessed. The request may also be communicated to iSCSI/FC kernel target driver 60. iSCSI/FC kernel target driver 60 may then export a SCSI LUN to client 30 (e.g., via FC or iSCSI) for the raw partition backup image 22. Client 30 may then "see" the disk (e.g., as a disk icon on a desktop display). Client 30 may then issue a "mount" command for the raw partition backup image 22 exposed to the client 30 via the SCSI LUN. The client 30 may then perform at least some standard file system operations on the mounted disk. For example, the client 30 may view the contents of the mounted disk, may restore one or more files from the mounted disk to the original disk if desired, or may copy contents of the mounted disk to other locations. When done, the client 30 may unmount the disk.

Backup API 24 may serve as a translation layer between the raw partition backup image 22 in backup(s) 22 and the iSCSI/FC kernel target driver 60. From the kernel SCSI level, an exemplary client 30 SCSI command may request to read N blocks of the raw partition from block X to block Y. The SCSI command will come to the iSCSI/FC kernel target driver 60. The iSCSI/FC kernel target driver 60 communicates this information to backup API 24. At the file system level of the media server, backup API 24 may access the data logical to physical mapping table 214 for the raw partition backup image 22 to translate the block information to the proper location in storage of the local file system, get the requested blocks from the raw partition backup image 22 in storage, and return the requested blocks to iSCSI/FC kernel target driver 60, which may then send the blocks to the client 30.

For a raw partition that is backed up using BLI, the backup API 24 may determine the "virtual" partition to be exported from the last full raw partition backup and any subsequent BLI backups using Inode 210 information. This "virtual" partition may then be exported via a SCSI LUN to a client system 30 so that the client system 30 sees the most up-to-date backed-up data of the raw partition.

For some operating system platforms, such as Solaris and Windows, the exported LUN may need to be formatted; that is, the exported LUN may need to have a correct partition table and signature. This may be platform-specific information, and is typically located in byte storage at the beginning of a partition. In one embodiment, the information may be backed up and stored with a raw partition backup image 22 during the raw partition backup process, and may be used during LUN export to provide the client 30 a correct view of the LUN. If the information was not there at the beginning of the partition, the client system may not be able to read the partition when mounted as a disk.

Figure 5:
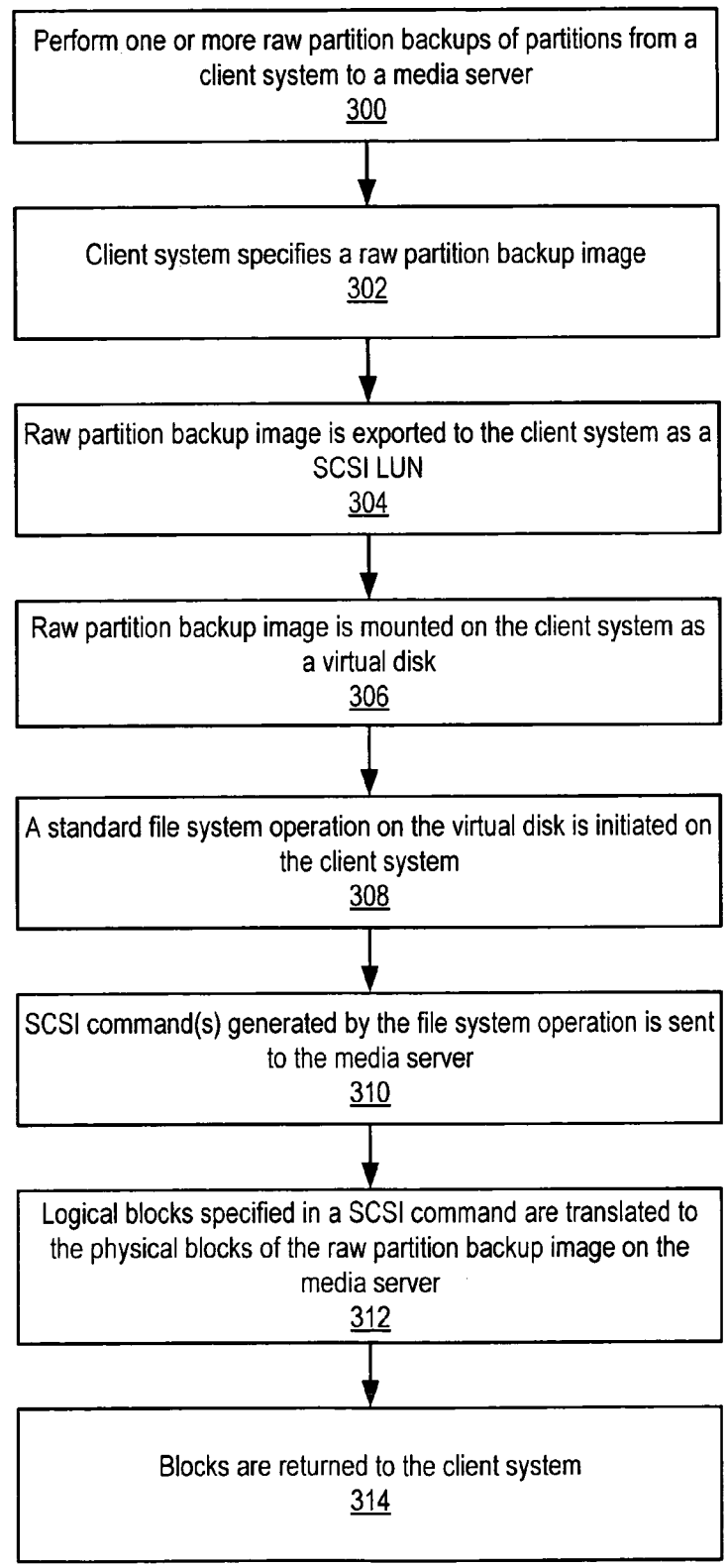
FIG. 5 is a flowchart of a method of exporting raw partition backup images on a media server as SCSI LUNs to client systems, according to one embodiment.

FIG. 5 is a flowchart of a method of exporting raw partition backup images on a media server as SCSI LUNs to client systems, according to one embodiment. As indicated at 300, one or more raw partition backups of partitions may be performed from a client system to a media server. As indicated at 302, the client system may specify a particular raw partition backup image on the media server that the client system desires to access. As indicated at 304, the specified raw partition backup image may be exported to the client system as a SCSI LUN. This export may be performed over Fiber Channel (FC), over an IP network using iSCSI, or in accordance with some other protocol that allows the export of SCSI LUNs.

After the raw partition backup image has been exported to the client system, the raw partition backup image may appear as a "virtual" disk on the client system. The virtual disk may then be mounted on the client system, as indicated at 306. Standard file system operations may then be performed on the virtual disk on the client system. As indicated at 302, a particular standard file system operation on the virtual disk may be initiated on the client system. For example, the client system may request to read a particular file or files. As indicated at 310, one or more SCSI commands generated by the file system operation may be sent to the media server. A SCSI command may include information on logical blocks of the partition that are to be returned.

On the media server, logical blocks specified in the SCSI command may be translated to the physical blocks of the raw partition backup image on the media server, as indicated at 312. A logical-to-physical mapping table may be accessed to perform the translation. The blocks may then be read from the raw partition backup image on the media server and returned to the client system, as indicated at 314. Note that the blocks may be returned over the FC or iSCSI connection in one or more SCSI messages.

Exemplary System

Figure 6:
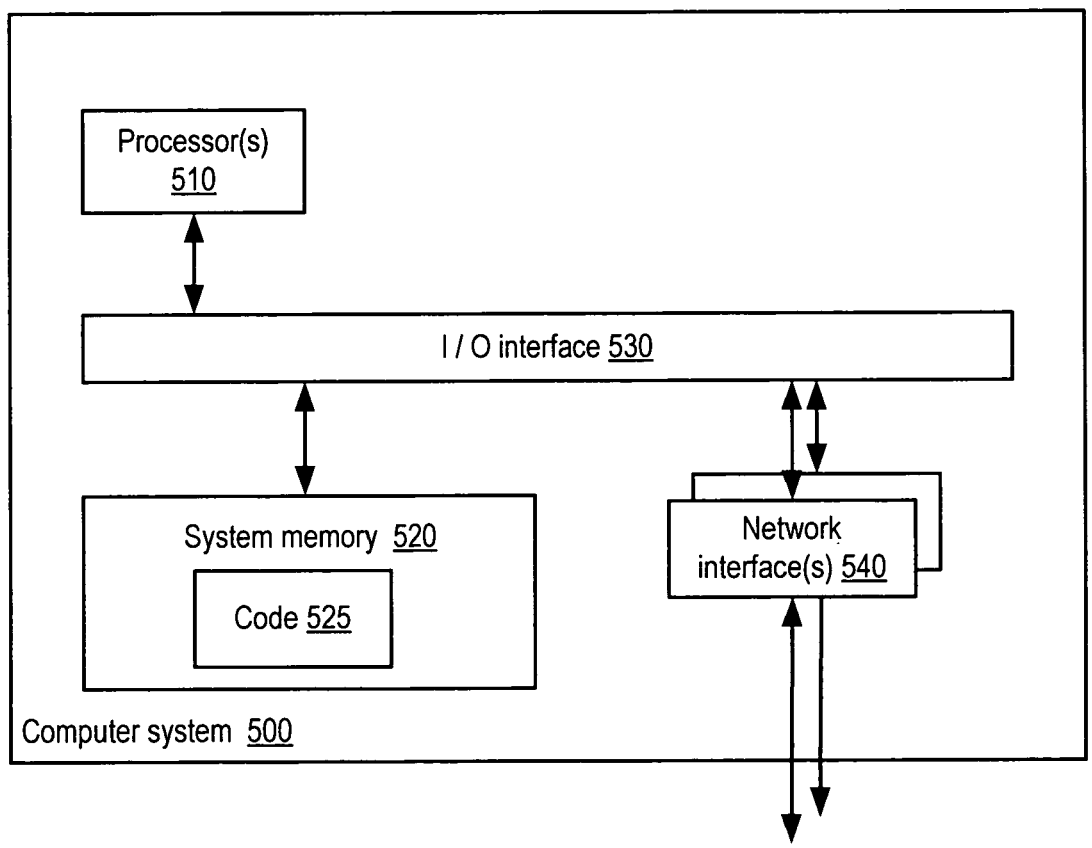
FIG. 6 is a block diagram illustrating an exemplary embodiment of a computer system.

In one embodiment, a system that implements an embodiment of the backup mechanism or one or more components of the backup mechanism as described herein may include a general-purpose computer system that includes or is configured to access one or more computer-accessible media, such as computer system 500 illustrated in FIG. 6. In the illustrated embodiment, computer system 500 includes one or more processors 510 coupled to a system memory 520 via an input/output (I/O) interface 530. Computer system 500 further includes one or more network interfaces 540 coupled to I/O interface 530. In some embodiments, computer system 500 may be illustrative of a system that implements an embodiment of the backup mechanism, while in other embodiments a system that implements an embodiment of the backup mechanism may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily; implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a backup mechanism, are shown stored within system memory 520 as code 525.

In one embodiment, I/O interface 530 may be configured to coordinate I/O traffic between processor 510, system memory 520, and any peripheral devices in the device, including network interface 540, or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

One or more peripheral devices may couple to system 500 via I/O interface 530, such as a keyboard, one or more cursor control devices (such as a mouse), and one or more monitors (which may also be referred to as displays or display devices).

Network interface(s) 540 may be configured to allow data to be exchanged between computer system 500 and other devices on a network or networks, such as other computer systems, for example. In particular, network interface(s) 540 may be configured to allow communication between computer system 500 and one or more client systems that may use the backup mechanism to backup raw partitions and to mount raw partitions as SCSI LUNs. In various embodiments, network interface 540 may support communication via any suitable wired or wireless data networks, such as types of Ethernet networks and Fibre Channel networks, for example. Additionally, network interface(s) 540 may support communication via telecommunications/telephony networks such as analog voice networks or digital fiber communications networks, via storage area networks such as Fibre Channel SANs, or via any other type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface(s) 540.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   performing a raw partition backup from a storage partition on a client system to a backup server to generate a raw partition backup image of the storage partition;
   the backup server exporting the raw partition backup image as a virtual disk to the client system in accordance with a standard protocol;
   mounting the virtual disk on the client system; and
   the backup server receiving one or more commands from the client system in accordance with the standard protocol to access the virtual disk at the backup server.

2. The method as recited in claim 1, wherein said exporting the raw partition backup image as a virtual disk to the client system comprises exporting the raw partition backup image as a SCSI LUN.

3. The method as recited in claim 1, wherein the standard protocol is one of Fibre Channel (FC) and iSCSI.

4. The method as recited in claim 1, wherein the client system is configured to store data in accordance with one type of file system, and the backup server is configured to store data in accordance with a different type of file system.

5. The method as recited in claim 4, further comprising performing one or more file system operations on the virtual disk on the client system in accordance with the file system of the client system.

6. The method as recited in claim 1, further comprising performing a restore of one or more files from the virtual disk to the partition on the client system in accordance with a file system of the client system.

7. The method as recited in claim 1, further comprising:
   initiating a file system operation on the virtual disk on the client system in accordance with a file system of the client system;
   sending a command to the backup server in accordance with the standard protocol in response to the initiated file operation, wherein the command specifies one or more logical blocks of the virtual disk;
   translating the one or more logical blocks specified in the command to one or more physical blocks of the raw partition backup image; and
   returning data from the one or more physical blocks of the raw partition backup image to the client system in accordance with the standard protocol, wherein said data corresponds to the one or more logical blocks.

8. The method as recited in claim 1, wherein, in said performing the raw partition backup, file system mapping of files of the storage partition is not performed.

9. The method as recited in claim 1, wherein the backup server requires no knowledge of the content of the raw partition backup image.

10. The method as recited in claim 1, wherein the backup server requires no knowledge of a file system used on the client system.

11. A backup server, comprising:
    one or more storage devices;
    a processor; and
    a memory comprising program instructions, wherein the program instructions are executable by the processor to implement a backup mechanism configured to:
       perform a raw partition backup from a storage partition on a client system to the one or more storage devices to generate a raw partition backup image of the storage partition on the one or more storage devices;
       export the raw partition backup image as a virtual disk to the client system in accordance with a standard protocol;
       wherein the virtual disk is mountable on the client system; and
       receive one or more commands from the client system in accordance with the standard protocol to access the virtual disk at the backup server.

12. The backup server as recited in claim 11, wherein, to export the raw partition backup image as a virtual disk to the client system, the backup mechanism is further configured to export the raw partition backup image as a SCSI LUN.

13. The backup server as recited in claim 11, wherein the standard protocol is one of Fibre Channel (FC) and iSCSI.

14. The backup server as recited in claim 11, wherein the client system is configured to store data in accordance with one type of file system, and the backup server is configured to store data in accordance with a different type of file system.

15. The backup server as recited in claim 11, wherein the backup mechanism is further configured to:
    receive a command in accordance with the standard protocol in response to a file operation on the virtual disk initiated on the client system in accordance with a file system of the client system, wherein the command specifies one or more logical blocks of the virtual disk;
    translate the one or more logical blocks specified in the command to one or more physical blocks of the raw partition backup image on the backup server; and
    return data from the one or more physical blocks of the raw partition backup image to the client system in accordance with the standard protocol, wherein said data corresponds to the one or more logical blocks.

16. A computer-accessible storage medium comprising program instructions, wherein the program instructions are computer-executable to implement a backup mechanism configured to:
    perform a raw partition backup from a storage partition on a client system to a backup server to generate a raw partition backup image of the storage partition on the backup server;
    export the raw partition backup image as a virtual disk to the client system in accordance with a standard protocol;
    wherein the virtual disk is mountable on the client system; and
    receive one or more commands from the client system in accordance with the standard protocol to access the virtual disk at the backup server.

17. The computer-accessible storage medium as recited in claim 16, wherein, to export the raw partition backup image as a virtual disk to the client system, the backup mechanism is further configured to export the raw partition backup image as a SCSI LUN.

18. The computer-accessible storage medium as recited in claim 16, wherein the standard protocol is one of Fibre Channel (FC) and iSCSI.

19. The computer-accessible storage medium as recited in claim 16, wherein the client system is configured to store data in accordance with one type of file system, and the backup server is configured to store data in accordance with a different type of file system.

20. The computer-accessible storage medium as recited in claim 16, wherein the backup mechanism is further configured to:
    receive a command in accordance with the standard protocol in response to a file operation on the virtual disk initiated on the client system in accordance with a file system of the client system, wherein the command specifies one or more logical blocks of the virtual disk;
    translate the one or more logical blocks specified in the command to one or more physical blocks of the raw partition backup image on the backup server; and
    return data from the one or more physical blocks of the raw partition backup image to the client system in accordance with the standard protocol, wherein said data corresponds to the one or more logical blocks.

* * * * *